United States Patent [19]

Nagamine et al.

[11] Patent Number: 5,327,762

[45] Date of Patent: Jul. 12, 1994

[54] ROLLING ROLLER AND ROLLING MILL

[75] Inventors: Takashi Nagamine; Jun Furukawa; Masayoshi Matsuda; Misao Makinohara, all of Tokyo; Hiroatsu Asari, Kobe; Masatoshi Fukuda, Kobe; Ryoichi Yamase, Kobe, all of Japan

[73] Assignees: NKK Corporation, Tokyo; Kawasaki Jukogyo Kabushiki Kaisha, Kyogo, both of Japan

[21] Appl. No.: 970,656

[22] Filed: Nov. 2, 1992

Related U.S. Application Data

[63] Continuation of Ser. No. 774,814, Oct. 11, 1991, abandoned.

[30] Foreign Application Priority Data

Apr. 17, 1991 [JP] Japan .................. 3-114079

[51] Int. Cl.$^5$ ............................................. B21B 31/18
[52] U.S. Cl. ..................................... 72/247; 72/252.5; 492/1
[58] Field of Search .............. 72/224, 238, 239, 245, 72/246, 247, 252.5, 366.2; 29/113.1, 117, 125, 129, 129.5, 130; 403/15, 34, 37; 492/1

[56] References Cited

U.S. PATENT DOCUMENTS 2,817,142  12/1957  Boden et al. .................. 403/15
4,744,235  5/1988  Schiller ........................ 72/238

FOREIGN PATENT DOCUMENTS

| 0346880 | 12/1989 | European Pat. Off. | 72/247 |
| 3720144 | 12/1987 | Fed. Rep. of Germany. | |
| 0019012 | 1/1984 | Japan | 72/238 |
| 0072603 | 4/1985 | Japan | 72/247 |
| 0082209 | 5/1985 | Japan | 72/247 |
| 0017310 | 1/1986 | Japan | 72/247 |
| 0156007 | 7/1987 | Japan | 72/247 |

Primary Examiner—Lowell A. Larson
Assistant Examiner—Thomas C. Schoeffler
Attorney, Agent, or Firm—Oliff & Berridge

[57] ABSTRACT

The present invention provides a rolling roller for rolling steel sections and that can have the roller width changed while not having a drive mechanism for changing the roller width provided to the rolling roller itself, thereby having a simple structure that facilitates exchange, and also provides a rolling mill suitable for use with such a rolling roller. The rolling roller has rolling wheels on a roller shaft and a sleeve and that engage the sleeve with respect to the roller shaft. In addition, the sleeve and the roller shaft are tightened and engaged at a place other than the inner side of the roller wheel and oil injection to the place of tightening and engagement is performed via hydraulic fluid supply paths formed inside the roller shaft.

9 Claims, 2 Drawing Sheets

ROLLING ROLLER AND ROLLING MILL

This is a continuation of Application Ser. No. 07/774,814 filed Oct. 11, 1991, now abandoned.

BACKGROUND OF THE INVENTION

The present invention relates to a rolling roller so-called (flat roller) that can adjust the roll width, which means gap of the shoulder of the rolling wheel portion, so as to roll flat steel, and also relates to a rolling mill provided with the rolling roller.

Rolling mills for rolling steel have a horizontal roller that comprises a roller shaft and sleeves that engage with the outer side of the roller shaft. Such a configuration makes it possible to roll H-section steels that have different web heights since the position of the sleeve in the axial direction can be changed to alter the roll width, which means the gap between the shoulder of the rolling wheel provided to the sleeve and the shoulder of the rolling wheel provided to the roll shaft, or the gap between the shoulders of each of the rolling wheels of two sleeves.

One example of such a conventional rolling mill is disclosed in Japanese Patent Application Laid-Open Publication No. 17310-1986. In this example, the adjustment of the position of the sleeve in the direction of the shaft requires means for moving the sleeve and fixing it with respect to the roll. This rolling mill is provided with hydraulic blocks (so-called hydraulic cylinders) at distal end portions of the roll shaft and these blocks are also linked to the sleeves on the roller shaft to move and fix it.

In addition to this, some rolling mills have an adjustment screw and a rotational drive mechanism built into the rolling roller so that the position of the sleeve in the axial direction can be adjusted by turning the screw to feed the sleeve.

However, the conventional rolling mill disclosed in Japanese Patent Application Laid-Open Publication No. 17310-1986 has the problems described under a) and b) below.

a) It is necessary for a hydraulic block that adjusts the position of the sleeve to be large and have a high output and to be provided on the rolling roller. During rolling, a significant rolling reaction, which can reach the order of several tons when large H-sections are being rolled, acting from the material being rolled and in the direction of the shaft, in other words, the direction of thrust, is applied to the sleeve and this force is a force that moves the sleeve with respect to the roller shaft. A significant output to resist this force is therefore necessary.

b) In addition to the rolling roller which assembled to the rolling mill and used therefor, it is also necessary to include a spare rolling roller. When there is wear and the like of the roller surface, the rolling roller that is assembled to the roller shaft and the sleeve and other parts must be taken from the fixed housing as it is, the rolling mill placed in standby and another rolling roller brought in to replace it. It is necessary from the point of view of productivity that this replacement work should be performed quickly and so a hydraulic block provided on the roller shaft must be assembled beforehand at a required place. This means that large-scale hydraulic blocks are necessary in large numbers and this requires additional cost, and there is also a considerable maintenance load as the replacement work becomes complex and involves much time.

On the other hand, when there is a position adjustment screw between the sleeve and the roll shaft, it is necessary to have a complex mechanism in order to drive the screw. That mechanism must also be incorporated into the rolling roller itself and so must also be exchanged when the rolling roller is exchanged and this also involves a significant cost and maintenance load.

SUMMARY OF THE INVENTION

An object of the present invention is to provide a rolling roller which can have the position of the sleeve adjusted and which does not have a drive mechanism to enable this provided to the roller itself, thereby having a simple structure which facilitates replacement, and a rolling mill which can have the roll width adjusted on line using such a rolling roller.

The rolling roller of the present invention engages at least one sleeve with respect to a roller shaft and includes a rolling wheel in two places in addition to on one sleeve, and is formed so a place other than an inner side of a rolling wheel tightly fits into and engages a sleeve and a roller shaft, and so that hydraulic fluid supply paths to these places of fitting and engagement are formed internally. The hydraulic fluid supply paths are, for example, formed via an internal portion of a roller shaft or sleeve and from a distal end.

The rolling roller described above can be fixed so that exchange of the rolling wheel is possible with respect to one sleeve and another portion such as another sleeve or roller shaft.

The rolling mill of the present invention can have a rolling roller immovably supported in the axial direction and so as to be freely rotatable by means of chocks at one sleeve and at two places other than the mounting position of the sleeve, and including means assembled into a housing via said chocks and which connects said hydraulic fluid supply means, such as piping that is connected to a pump or the like, to the supply paths and that adjusts a position of engagement in the axial direction of a sleeve and a roll shaft with respect to at least one of the chocks. This adjustment means can be any means as long as it is mounted to the fixed housing or the like, to a structural object on the same floor, or to the facility installation platform, and as long as it exerts a force, with respect to the chock, in the direction of the shaft of the rolling roller.

With the rolling roller of the present invention, the tightening force at the place of fitting and engagement tightly fixes the sleeve, without the use of any special mechanisms, with respect to the roller shaft. When the roller is in this status, the roller wheels respectively provided at the two places on the one sleeve and the roller shaft, that is, the roller wheels respectively provided at the two places of the one sleeve and another sleeve perform the rolling of the formed steel.

The adjustment of the roll width, which means the gap between the shoulder of the roller wheels at the two places described above, in such a rolling roller can be performed by applying hydraulic pressure to the place of engagement via hydraulic fluid supply paths such as through the implementation of oil injection, and then applying relative movement between the sleeve and the roller shaft at that place. If a hydraulic pressure (so-called surface pressure) that exceeds the tightening force is applied to the entire region of the place of engagement described above, and if that place is not the inner side of the roller wheel, then the internal diameter of the sleeve is effectively increased because of Pascal's Principle for fluid pressure. In this status, position adjustment of the sleeve with respect to the roller shaft can be easily performed by one of many means such as a special drive mechanism or a simple fitting or jig of the manual operation type so that it is possible to adjust the roller width even inside the rolling mill while on line, or in the on line status when the rolling roller is taken from the rolling mill. When the changing of the roller width is completed, the fluid pressure can be reduced and the sleeve engaged with the roller shaft and fixed. Moreover, if the place for engagement is on the inner side of the roller wheel, then the same portion of thickness can prevent the expansion of the inner diameter of the sleeve, so that during hot rolling, the temperature conditions of that portion are considered whenever roll width adjustment has to be performed. For this reason, a place on the inner side of the rolling wheel should be avoided as the place for engagement.

On the basis of performing simple adjustment of the rolling width using one of a number of simple methods, this rolling roller does not require the provision of a drive mechanism such as a sleeve or the like, to the rolling roller itself, and so the structure of the portion that is the object of exchange is simplified, and there is the advantage of exchange operation being facilitated.

In addition, the rolling roller can be exchanged by independently exchanging the roller wheel that is easily worn because it is in contact with the material of the object to be rolled, and therefore has a long life as a rolling roller. This is to say that if it is only the rolling wheel that is easily worn, deformed or cracked is exchanged, the other portions that have relatively little wear will be able to be used for a long period.

Furthermore, the rolling mill of the present invention is provided with the rolling wheel described above as the flat roller, and is also provided with hydraulic fluid supply means between the roller shaft and the sleeve, which is the place of tightening and engagement, and means for adjusting the position of engagement of the sleeve via the chock, and so the adjustment of the position of the roller width is simple and the maintainability of the rolling roller is also simplified. More specifically, the adjustment of the roller width can be performed by supplying hydraulic fluid from the supply means described above and via the hydraulic fluid supply paths to the place of tightening and engagement and by using the adjustment means described above to change the position between the roller shaft and the sleeve via the chock. The chock, that is, the bearing box supports the rolling roller via the bearings so the roller width adjustment can be performed, for example, while the rolling roller is rotating. In addition, because the engagement position adjustment means is not provided to the roller itself, it is possible to remove only the rolling roller without removing the adjustment means, and opening the connection between the rolling roller and the hydraulic fluid supply means is simple and, so other than the adjustment means described above and the fluid supply means described above, the rolling roller of the present invention can have maintenance, including demounting and mounting, operation performed in an effective status with respect to cost and the workability.

Moreover, with this rolling mill, the engagement position adjustment means between the sleeve and the roller shaft is provided to a portion other than the rolling roller, as described above, so the speed and the performance for adjusting the roller width can be easily raised. When there is means provided to the rolling roller itself, as is conventionally done, the limitations of size and weight result in the means having an insufficient performance, and hamper the fast adjustment of the roll width.

DESCRIPTION OF THE PREFERRED EMBODIMENTS

Figure 1:
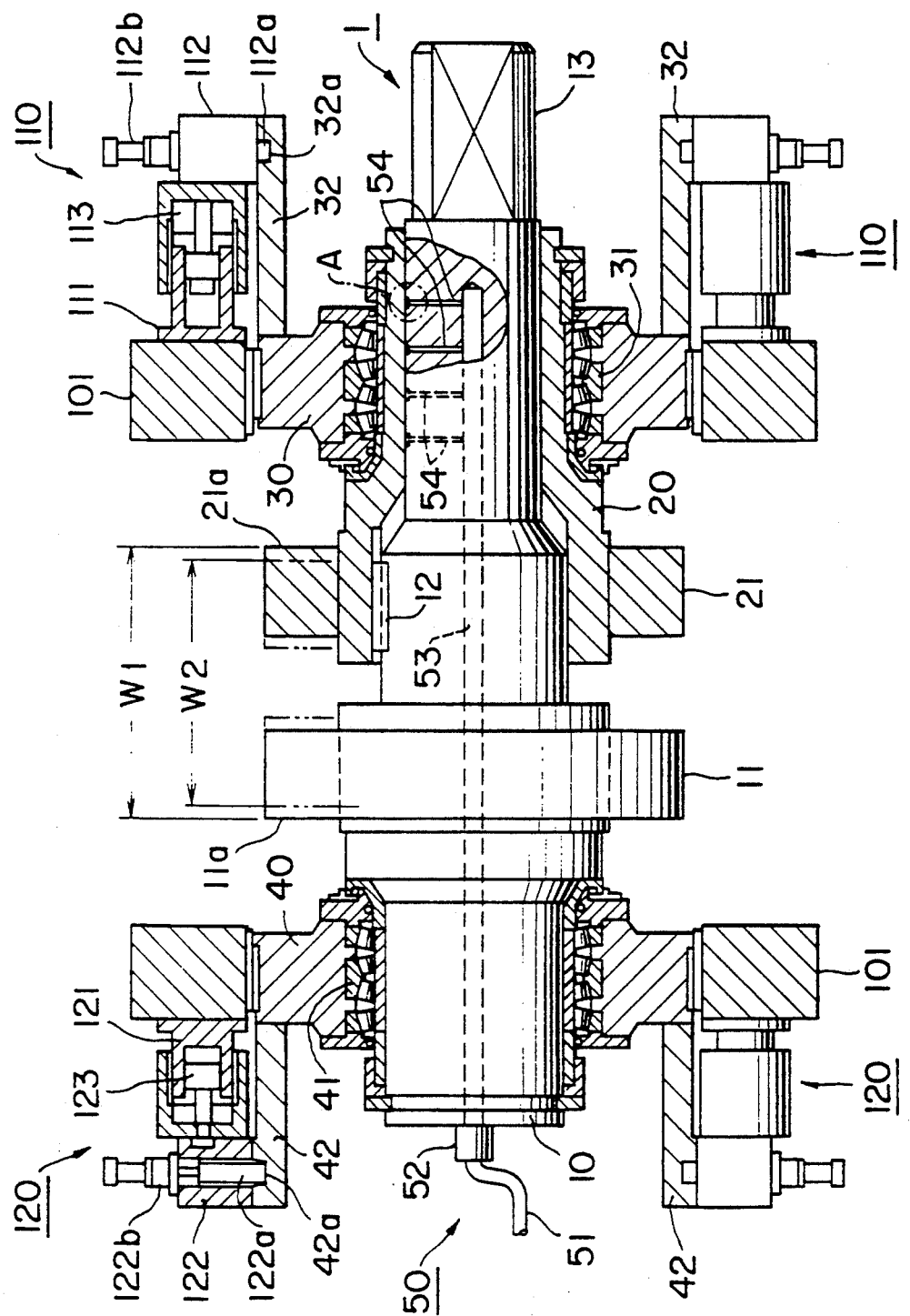
FIG. 1 is a horizontal sectional drawing taken along the rolling roller and shows one portion of a rolling mill according to a first embodiment of the present invention.
Figure 2:
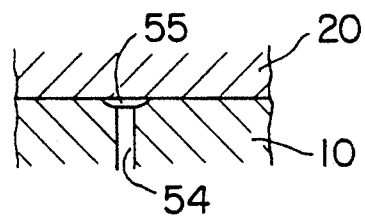
FIG. 2 is an enlarged drawing of the portion indicated by A in FIG. 1.

A preferred embodiment of the present invention will become understood from the following detailed description referring to the accompanying drawings. FIG. 1 is a horizontal sectional drawing taken along the rolling roller and shows one portion of a rolling mill according to a first embodiment of the present invention, and FIG. 2 is an enlarged drawing of the portion indicated by A in FIG. 1. This rolling mill is a universal mill for rolling H-section steel and, in addition to the roller 1 shown in the figure, has another rolling roller (not shown in the figure) and which is parallel to the roller 1, while two vertical rollers (also not shown in the figure) are vertically provided at each end of the shaft. The gap W1 between the shoulders 11a and 21a on each of the outer sides of the rolling wheels 11 and 21 in the center of the drawing is the rolling width, and becomes the height of the web (inner piece) of the H-section steel that is rolled.

The rolling roller 1 engages with the roller shaft 10 and the sleeve 20 as shown in FIG. 1 and so is supported by the chocks 30 and 40 (so-called the bearing box) at two places provided to the two outer sides of the rolling wheels 11 and 21. Engaging the roller shaft 10 and the sleeve 20 allows both to be slid to change the dimension of the gap W1, and enables various types of H-section steel having different web heights to be rolled without exchanging the rolling roller 1. Moreover, the transmission of the rolling torque from the roller shaft 10 to the sleeve 20 is such that there is a sufficient frictional force due to the tightening between the two so that there is no relative movement between the two. In this example, the transmission of the rolling torque is made more definite by the gear 12 between the roller shaft 10 and the sleeve 20 although the two can be connected by a spline. In addition, the rolling wheels 11 and 21 are made into a single unit by being respectively welded to the outer circumference of the roller shaft 10 and the sleeve 20. The distal end portion 13 of the roller shaft 10 is the connection portion to the rotational drive source (not shown in the figure) which comprises a motor and the like.

The chocks 30 and 40 are inserted into the main body between the fixed housing 101 of the rolling mill so that they do not rotate, but can move in the direction of the shaft, and each support the roller 1 via the bearings 31 and 41 on their inner sides respectively, so that the roller 1 is freely rotatable, Moreover, the chock 30 is directly supported on the outer circumference of the sleeve 20 and the chock 40 supports the roller shaft 10, while each of the chocks 30 and 40 sufficiently supports the thrust load as well as the radial load.

The gap W1 described above is freely set, that is, the sleeve 20 can be moved and fixed with respect to the roller shaft 10, and so the rolling mill is made to have the mechanisms 1) and 2) described below.

1) To the roller shaft 10 and one portion of the sleeve 20 is provided a place of engagement having a tightening fitting and there is oil injection between the engaging surfaces at that place. In this example, the tightening fitting is the portion on the inner side of the chock 30, and an intermediate tightening fitting having only slight tightening or engagement with a gap still remaining is on the inner side of the rolling wheel 21. To the surface of the roller shaft 10 at the place of the tightening fitting is provided a ring-shaped pressure space 55, as shown in FIG. 2, and to the inner portion of the roller shaft 10 are formed the hydraulic fluid supply paths 53 and 54 so that the space 55 has an opening. Connected via a rotary joint 52 to the distal end portion of this supply path 53 is a hydraulic pipe 51 connected in turn to a hydraulic fluid source (not shown in the figure), as the hydraulic fluid supply means 50.

Because the sleeve 20 is fixed to the roller shaft 10 by a suitable tightening force, even if a large rolling reaction, which means thrust force acting in the direction to approach the shoulders 11a and 21a, acts on the rolling wheels 11 and 21 during rolling, there is no slippage between the roller shaft 10 and the sleeve 20. On the other hand, when the supply means 50 described above injects oil between the engaging surfaces, the engagement between the roller shaft 10 and the sleeve 20 is released and the relative movement of both in the direction of the shaft is enabled. At this time, the outer diameter of the sleeve 20 is increased but the amount of this enlargement is only slight and presents no problem for containment within the engagement gap with respect to the bearing 31. Moreover, the rolling reaction force during rolling is practically all cancelled in the direction opposing the direction of the shaft, which means the direction to the left and right in FIG. 1, so the thrust load that is applied to the chocks 30 and 40 and to the engagement position adjustment means 110 and 120, to be described later, is extremely small when compared to the absolute value of the rolling reaction force.

2) The engagement position adjustment means 110 and 120 that are configured so as to freely contract and elongate are, respectively, mounted to the fixed housing 101 and engage, so as to be freely mountable and demountable, with respect to each pair of brackets 32 and 42 and the chocks 30 and 40. The engagement position adjustment means 110 on the side of the chock 30 is configured from a base portion ill that is fixed to the fixed housing 101, a distal end portion 112 that engages with the bracket 32, a hydraulic cylinder 113 disposed between the two is provided further to the outer side, which means the side of the reaction shaft, than the chock 30. To the distal end portion 112 is a keeper plate 112a which engages with the concave portion 32a of the bracket 32 and which is mounted to the contracting and elongating end of the hydraulic cylinder 112b. The adjustment means 120 on the side of the other chock 40 is configured in the same manner as the adjustment means 110, and comprises a base portion 121, a distal end portion 122, and a hydraulic cylinder 123 and the like, and to the distal end portion 122 are provided a hydraulic cylinder 122b and a keeper plate 122a which can engage with the concave portion 42a of the bracket 42. Moreover, the hydraulic cylinders 113 and 123 can be any type of actuator, such as a solenoid type of a screw mechanism, as long as they can elongate and contract but the output must be greatly smaller than the rolling reaction force for the reason described above.

When oil injection is performed by 1) above, the cylinder 113 of the adjustment means 110 contracts from the status shown in FIG. 1 and the sleeve 20 moves in the direction of the roller shaft 10 along with the chock 30, and when the cylinder 123 of the adjustment means 120 contracts, the roller shaft 10 moves along with the chock 40.

The engagement position adjustment means 110 and 120 have distal end portions 112 and 122 so as to be mounted and dismounted to and from their respective brackets, when each of the cylinders 112b and 122b are contracted, after keeper plates 112a and 122a are separated from the brackets 32 and 42 and retreat in the outwards direction. In this retreated status, the separation of the piping 51 and the joint 52, for example, the rolling roller 1 can be exchanged (that is, the sleeve 20 and the rolling wheels 11 and 21 assembled to the rolling roller 10) by being taken from the fixed housing 101 along with the chocks 30 and 40, and independently from the engagement position adjustment means 110 and 120. When this is done, the engagement position adjustment means 110 and 120 are not removed and remain fixed to the respective housings 101 and the distal end portions 112 and 122 engage with respect to the chock 30, 40 of the rolling roller 1 that is newly placed in. This is to say that in this rolling mill, the rolling roller 1 can be exchanged without removing the ancillary mechanisms for moving the roller shaft 10 and the sleeve 20, for repairs. In accordance with necessity, the chocks 30 and 40 are dismounted and mounted with respect to the rolling roller 1 that has been taken from the rolling mill, but this work entails no particular difficulty and is performed in the conventional manner.

In the rolling mill configured as described in 1) and 2) above, the gaps W1 and W2 of the rolling wheels 11 and 21 (the shoulders 11a and 21a) of the rolling roller 1 are as described below.

(1) As shown in FIG. 1, in the status where each of the distal end portions 112 and 122 (keeper plates 112a and 122a) of the engagement position adjustment means 110 and 120 are, respectively, engaged with the brackets 32 and 42, oil is injected from the hydraulic fluid supply means 50 to inside the space 55 and via the supply paths 53 and 54 that are formed inside the roller shaft 10.

(2) Each of the cylinders 113 and 123 of the engagement position adjustment means 110 and 120 are respectively tightened by $$(W1 - W2)/2$$

so that the sleeve 20 in FIG. 1 moves to the left and so that the roller shaft 10 moves to the right to make the gap between the roller wheels 11 and 21 equal to W2.

(3) The cylinders 113 and 123 are stopped and the oil injection stopped (to lower the hydraulic pressure) and the roller shaft 10 and the sleeve 20 are again returned to their tightened status and fixed.

Figure 3:
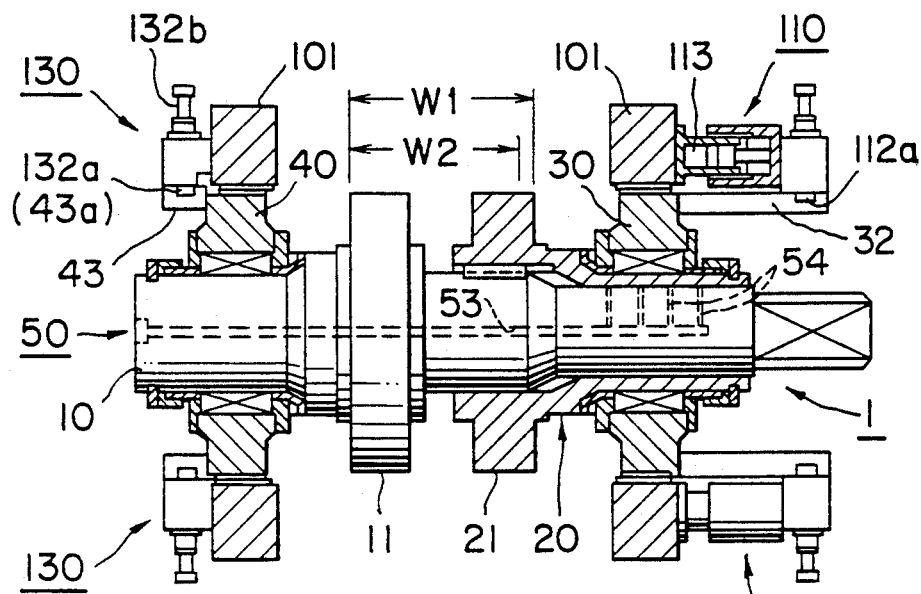
FIG. 3 is a horizontal sectional drawing taken along the rolling roller as for FIG. 1, and shows one portion of a rolling mill according to a second embodiment of the present invention.
Figure 4:
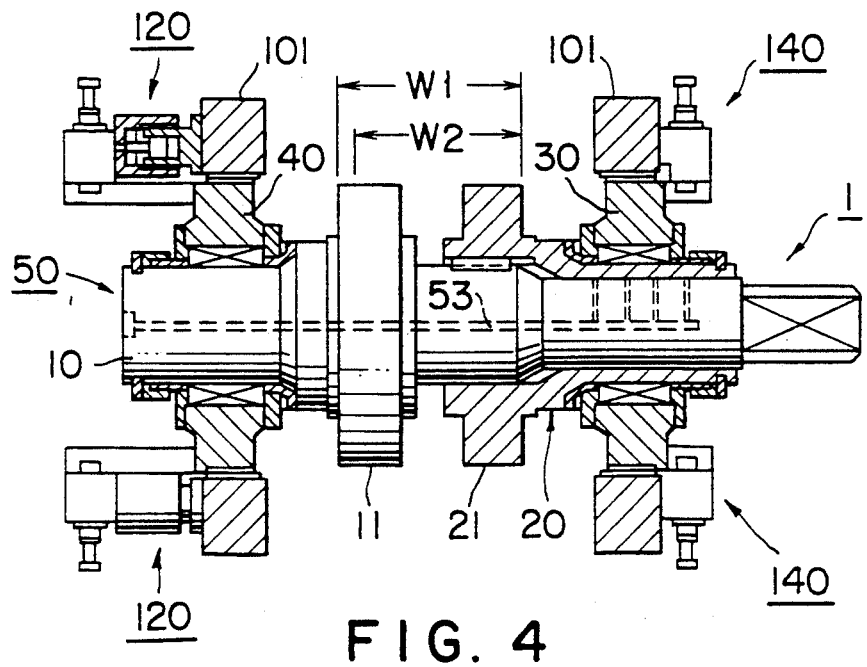
FIG. 4 is a horizontal sectional drawing taken along the rolling roller as for FIG. 1, and shows one portion of a rolling mill according to a third embodiment of the present invention.

In this first embodiment described above, the engagement position adjustment means 110 and 120 are provided to the fixed housing 101 for both of the chocks 30 and 40, but an engagement position adjustment means 110, 120 that has such a contraction and elongation function can perform a change in the gap W1 by only being provided to one of the chock 30 or the chock 40. FIG. 3 and FIG. 4 show rolling mills of second and third embodiments that are provided with an adjustment mechanism for adjusting the gap between the fixed housing and the chock on only one side.

First, in the rolling mill shown in FIG. 3 (second embodiment), the adjustment mechanism 110 is provided only with respect to the chock 30 that directly supports the sleeve 20, and there is no contraction and elongation function with respect to the chock 40 on the side that supports the roller shaft 10, and there is only a stopper means 130 fixed to the fixed housing 101 so as to determine the reference position of the chock 40. The stopper means 130 is provided with a hydraulic housing 132b that has mounted to it a keeper plate 132a to the end that contracts and elongates, and has only the function of the distal end portion 122 of the adjustment means 120 described above. More specifically, it is possible for the chock 40 and the concave portion 43a of the pair of brackets 43 to engage the keeper plate 132a if the cylinder 132b is elongated, and for the plate 132a to be separated from the bracket 43 and retreat to the outer side when the cylinder 132b is contracted.

In the rolling mill shown in FIG. 3, the procedure for changing the gap W1 between the rolling wheels 11 and 21 is as described below.

(1) Each of the keeper plates 112a and 132a of the engagement position adjustment means 110 and the stopper means 130 are respectively engaged with the brackets 32 and 43.

(2) Oil is injected between the engaging surfaces of the roller shaft 10 and the sleeve 20, via the supply path 53.

(3) The cylinder 113 of the engagement position adjustment means 110 is contracted and slides the sleeve 20 along with the chock 30 in the direction to the left make the gap between the rolling wheels 11 and 21 the required gap W2.

(4) The oil injection is stopped once the cylinder 113 has come to a stop.

(5) By moving only the sleeve 20, the centers of the rolling wheels 11 and 21 are in the displaced status and so when the procedure (4) above has been completed, the plate 132a of the stopper means 130 is separated from the bracket 43 and the cylinder 113 is returned slightly by half of the amount of elongation and contraction of the procedure (3) above and centering performed.

During rolling, the plate 132a of the stopper means 130 does not engage with the concave portion 43a of the bracket 43 and so the stopping of the movement in the direction of the shaft of the rolling roller 1 and with respect to the fixed housing 101 is due to the force of the adjustment means 110. As has been described above, the force of the rolling reaction force that moves the absolute position of the rolling roller 1 is small, so no problems occur because of it. When the gap W2 is changed further, the status under the procedure (1) above occurs again when the roller 1 is moved by the adjustment means and the procedures (2) above and later are then performed.

Moreover, depending upon the facility arrangement before and after the rolling mill, there are cases where it is not necessary to perform centering with the center of the rolling line and the center of the roll width (the gap W1 or W2 of the rolling wheels 11 and 21 ) and in these cases it is not necessary to perform the procedure (5) described above.

On the other hand, with the rolling mill of the third embodiment shown in FIG. 4, there is an engagement position adjustment means 120 provided with respect to only the chock 40 on the side of the roller shaft 10, and stopper means 140, which has the same structure and function as the stopper means 130 described above, is fixed to the fixed housing 101 with respect to the other chock 30. In this rolling mill as well, it is possible to change the gap W1 of the rolling wheels 11 and 21 by a means that is the same as that of the second embodiment described above. However, the gap W1 is adjusted to the gap W2, for example by moving the roller wheel 10 and not the sleeve 20 and so it is necessary for the procedures (1) to (5) above to be suitably reordered. In addition to the embodiments described above, it is also possible to have many modifications for the rolling roll and the rolling mill of the present invention. For example, two sleeves can engage the roller shaft, and rolling wheels can be, respectively, provided to each of the sleeves. In this case, if there are fluid supply paths and fluid supply means configured so that the hydraulic pressure is respectively and separately applied to the places for tightening and engagement between the roller shaft and each of the sleeves, then it is possible to adjust the engagement position, that is, the gap (roller width) of the roller wheel in exactly the same manner as has been described above. The roller wheel portion can be fixed with respect to the roller wheel and the sleeve as shown in FIG. 1 (for the first embodiment) so that it can be exchanged but it is also possible for it to be a unit as in the cases shown in FIG. 3 (for the second embodiment) and FIG. 4 (for the third embodiment).

The rolling roller of the present invention has simple adjustment of the roller width and also does not require a drive mechanism (engagement position adjustment means) to be provided to the rolling roller itself for adjustment, and therefore has a simple structure. Accordingly, it is possible to eliminate mechanisms for spare rollers and for the cost to be lowered, along with other advantages, such as simplified maintenance and exchange operations for the rolling rollers.

In addition, the rolling roller can be made to have an extended life by exchanging only the rolling wheel in accordance with the conditions of wear. This is an important factor in reducing the costs involved with rolling.

The rolling mill of the present invention produces the following effects.

1) With respect to adjustment of the roller width, it is not necessary to have high output means for performing movement and fixing between the rolling shaft and the sleeve.

2) The adjustment of the roller width can be performed on line while the rolling roller is rotating. Accordingly, it is possible to realize reverse rolling where the rolling width is changed during passes after one pass has been completed and before the next pass has started.

3) The engagement position adjustment means is a portion other than the rolling roller and can be easily made to have a high performance, thereby facilitating fast adjustment of the roller width. This, along with the effect 2) described above, improves the rolling efficiency and, in particular when hot rolling processes are being performed, means that rolling can be performed while the temperature drop of the material being rolled is still small.

4) Unlike conventional rolling mills where the roller width is changed on the basis of the roller width or the sleeve, it is possible to have position adjustment of the roller with respect to the absolute position of the rolling roller, that is, with respect to the rolling line itself, and not as a relative position between both.

5) The rolling roller is removed from the rolling mill independently of the engagement position adjustment means and so there are cost and workability advantages relating to the maintenance of the rolling roller.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A rolling mill, comprising:
   a roller shaft;
   one sleeve fitted to said roller shaft, said roller shaft and said one sleeve forming an adjustable horizontal roll, a first rolling wheel mounted to said one sleeve and a second rolling wheel associated with said roller shaft, said one sleeve having a first portion tightly fitted to said roller shaft and a second portion having a gap between said second portion and said roller shaft with said first rolling wheel mounted to said second portion;
   a mill housing;
   chock means for rotatably supporting said adjustable horizontal roll;
   adjustment means for adjusting a gap between outer shoulders of said first and second rolling wheels by relatively moving said first and second rolling wheels in either direction of an axis of said roller shaft, said adjustment means mounted to said housing and releasably engaging said chock means; and
   hydraulic fluid supply means for injecting fluid between said roller shaft and said first portion of said one sleeve supported by a first chock of said chock means to expand said first portion in a radial direction and release the tightly fitted said first portion from said roller shaft thereby enabling said adjustment means to adjust the gap, wherein an initial gap is set prior to commencing rolling by said adjustment means positioning said first and second rolling wheels as needed and the gap is adjustable during rolling by said adjustment means positioning said first rolling wheel when fluid is injected by said hydraulic fluid supply means.

2. The rolling mill as claimed in claim 1, wherein said adjustment means comprises a first adjustor means and a second adjustor means, said first adjustor means engaging said first chock of said chock means supporting said one sleeve at said first portion and said second adjustor means engaging a second chock of said chock means supporting said roller shaft.

3. The rolling mill as claimed in claim 2, wherein said first and second chocks are slidable in a plane parallel to a longitudinal axis of the roller.

4. The rolling mill as claimed in claim 1, wherein said adjustment means engages at least one of said first chock of said chock means supporting said one sleeve and a second chock of said chock means supporting said roller shaft.

5. The rolling mill as claimed in claim 4, further comprising stopper means for engaging an opposite one of said first chock and said second chock than a one engaged by said adjustment means.

6. The rolling mill as claimed in claim 1, wherein said hydraulic fluid supply means further comprises:
   a fluid reservoir;
   pumping means for supplying the fluid;
   a fluid pathway through said roller shaft;
   a fluid pipeline between said fluid reservoir and said roller shaft;
   a rotatable coupling connecting said fluid pipeline and said roller shaft; and
   fluid openings in said roller shaft for introducing fluid between said roller shaft and said one sleeve.

7. A rolling mill having a fixed housing, comprising:
   a first chock and a second chock removably mounted to the fixed housing;
   a roller shaft rotatably supported by said first chock;
   a first rolling wheel mounted on said roller shaft;
   a sleeve having a first portion and a second portion, said sleeve being tightly fitted to said roller shaft at said first portion, said second chock rotatably supporting said sleeve at said first portion such that said roller shaft and said sleeve form a rolling roller rotatably supported by said first and second chocks;
   a second rolling wheel fixedly mounted at said second portion of said sleeve;
   drive means for rotating said rolling roller;
   hydraulic feed paths in said roller shaft, said hydraulic feed paths terminating in pressure spaces beneath said first portion of said sleeve;
   a first adjustment means mounted to the fixed housing for engaging with and disengaging from said first chock;
   a second adjustment means mounted to the fixed housing for engaging with and disengaging from said second chock; and
   hydraulic fluid supply means for providing pressurized fluid to said hydraulic feed paths, wherein said sleeve is immovably fixed in the axial direction on said roller shaft when no fluid is supplied by said hydraulic fluid supply means and said sleeve is axially movable on said roller shaft when the pressurized fluid is provided, said first and second adjustment means setting rolling width by relatively moving said first and second rolling wheels in either direction along an axis of said rolling roller when pressurized fluid is provided prior to commencing rolling and at least said second adjustment means is used for adjusting the rolling width when pressurized fluid is provided during rolling operations, said pressurized fluid expanding said first portion of said sleeve to permit axial movement of said sleeve along said roller shaft.

8. The rolling mill as claimed in claim 7, wherein said rolling roller and said first and second chock are removable from said rolling mill after respective disengagement from said first and second adjustment means.

9. The rolling mill as claimed in claim 7, wherein said first rolling wheel is mounted to a second sleeve, said second sleeve having a two portion structure of the first sleeve and said roller shaft further having hydraulic feed paths terminating in pressure spaces beneath said first portion of said second sleeve, movement of said second sleeve obtained in a manner substantially the same as said first sleeve.

* * * * *